(12) United States Patent
Noh et al.

(10) Patent No.: US 8,149,782 B2
(45) Date of Patent: Apr. 3, 2012

(54) RANGING METHOD USING NEW RANGING STRUCTURE

(75) Inventors: Min Seok Noh, Anyang-si (KR); Yeong Hyeon Kwon, Anyang-Si (KR); Jin Sam Kwak, Anyang-Si (KR); Dong Cheol Kim, Anyang-Si (KR); Sung Ho Moon, Anyang-Si (KR); Seung Hee Han, Anyang-Si (KR); Hyun Woo Lee, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 619 days.

(21) Appl. No.: 12/347,615

(22) Filed: Dec. 31, 2008

(65) Prior Publication Data

US 2009/0201877 A1    Aug. 13, 2009

Related U.S. Application Data

(60) Provisional application No. 61/018,493, filed on Jan. 1, 2008, provisional application No. 61/101,119, filed on Sep. 29, 2008, provisional application No. 61/103,938, filed on Oct. 9, 2008.

(30) Foreign Application Priority Data

Apr. 11, 2008    (KR) .................. 10-2008-0033879

(51) Int. Cl.
*H04W 4/00*    (2009.01)
(52) U.S. Cl. ........................................ 370/330; 370/331

(58) Field of Classification Search ...................... None
See application file for complete search history.

(56) References Cited

U.S. PATENT DOCUMENTS

| | | | |
|---|---|---|---|
| 6,757,518 B2 | 6/2004 | Spratt et al. | |
| 7,194,288 B2 | 3/2007 | Lee et al. | |
| 7,310,303 B2 | 12/2007 | Koo et al. | |
| 2007/0183391 A1* | 8/2007 | Akita et al. | 370/350 |
| 2007/0291696 A1* | 12/2007 | Zhang et al. | 370/331 |
| 2008/0031186 A1* | 2/2008 | Onggosanusi et al. | 370/328 |
| 2008/0267134 A1* | 10/2008 | Cheng et al. | 370/335 |
| 2009/0219801 A1* | 9/2009 | Jeong et al. | 370/210 |
| 2010/0322160 A1* | 12/2010 | Yeh et al. | 370/329 |

\* cited by examiner

*Primary Examiner* — John Blanton
(74) *Attorney, Agent, or Firm* — Birch, Stewart, Kolasch & Birch, LLP

(57) ABSTRACT

A method for performing ranging in a broadband wireless access system including a user equipment and a base station and using multi-carrier is described. A method using a structure in which a length of a part occupied by a ranging sequence is extended in the time domain includes a method using a structure in which a preamble occupied by the ranging sequence is repeated three times or more, a method using a structure in which a length of a preamble occupied by the ranging sequence is extended in the time domain, and a method using a structure in which lengths of a cyclic prefix and/or a guard time in the time domain are designed in consideration of a delay spread of a channel and a trip delay. Even in a cell structure having an extended radius, the trip delay can accurately be estimated.

11 Claims, 19 Drawing Sheets

(a) Initial ranging or HO ranging transmission for OFDMA (b) Initial ranging or HO ranging transmission for OFDMA, using two successive initial ranging or HO ranging codes (c) Periodic ranging or BR transmission for OFDMA, using one code (d) Periodic ranging or BR transmission for OFDMA, using three successive codes (a) Case 1

(b) Case 2

[Ranging structure]

[Interference between ranging codes]

(a) 16e code (length=144)

(b) ZC code (length=139)

[Correlation characteristic of code]

PLUS(Use of 0 to 5th subchannel)

[Correlation characteristic of exact mapping]

(20MHz system bandwidth, 2048-point FFT, UL_Permbase=0

(b)AMC(Use of 0 to 7th subchannel)

[Correlation characteristic of exact mapping]

(20MHz system bandwidth, 2048-point FFT, UL_Permbase=0)

(a) Three repetitions (b) Four repetitions (a)

(b)

(c)

(a)

(b)

(c)

(a) Cell radius[km]

(b) Cell radius[km]

[Example of CP, sequence part, and GT according to cell radius]

(a) With CP (b) Without CP

[Dedicated ranging structure with localized subcarrier allocation]

(a)

Example of a plurality of ranging slots (b)

(a) One repetition (b) Two repetitions

[Example of repeating preamble in localized ranging]

(a) One repetition (b) Two repetitions

[Example of repeating preamble in localized ranging per basic unit]

(a) Example of preamble repetiotion including CP for localized ranging (b) Example of preamble repetiotion including CP for localized ranging per basic unit

[An example of CP+preamble repetition]

RANGING METHOD USING NEW RANGING STRUCTURE

This Non-provisional application claims priority under 35 U.S.C. §119(e) on U.S. Provisional Application No(s). 61/018,493, filed Jan. 1, 2008; 61/101,119, filed Sep. 29, 2008; and 61/103,938, filed Oct. 9, 2008, and under 35 U.S.C. §119(a) on Patent Application No(s). 10-2008-0033879 filed in the Republic of Korea on Apr. 11, 2008. The entire contents of all of the above applications are hereby incorporated by reference.

TECHNICAL FIELD

The present invention relates to a broadband wireless access system, and more particularly, to a ranging method in a broadband wireless access system.

BACKGROUND ART

Network Entry Procedure During Initialization of Mobile Station in Wireless Access System FIG. 1 is a flow chart illustrating a network entry procedure when a user equipment (UE) is initialized in a broadband wireless access system.

(1) When initially powered on, a UE searches for a downlink channel and acquires uplink/downlink synchronization with a base station (BS). In this case, the UE acquires uplink/downlink channel parameters by receiving a downlink-MAP (DL-MAP) message, an uplink-MAP (UL-MAP) message, a downlink channel descriptor (DCD) message, and an uplink channel descriptor (UCD) message.

(2) The UE performs ranging with the BS to adjust uplink transmission parameters and receives a basic management connection identifier (CID) and a primary management CID from the BS.

(3) The UE negotiates basic capabilities with the BS.

(4) The UE implements authorization.

(5) The UE registers itself with the BS. The UE managed by an Internet Protocol (IP) receives a secondary management CID from the BS (6) The UE establishes IP connectivity.

(7) A current date and time are established.

(8) Constituent files of the UE are downloaded from a trivial file transfer protocol (TFTP) server.

(9) Connection for a prepared service is established.

A physical layer of a broadband wireless access system is divided into a single-carrier type and a multi-carrier type. The multi-carrier type uses orthogonal frequency division multiplexing (OFDM), and introduces orthogonal frequency division multiple access (OFDMA) as an access method capable of allocating resources in units of subchannels grouping a part of carriers.

In an OFDMA physical layer, active carriers are separated into groups and the separated carriers are transmitted to different receiving ends. A group of carriers transmitted to one receiving end is called a subchannel. Carriers constituting each subchannel may be adjacent to each other or may be separated from each other at regular intervals. Since such multiple accesses in units of subchannels are possible, a frequency diversity gain, a gain caused by concentration of power, and forward power control can be efficiently performed although complexity of implementation is increased.

A slot allocated to each user is defined by a data region of a two-dimensional time-frequency space and represents a set of successive subchannels allocated by bursts. In OFDMA, one data region is illustrated by a rectangular determined by time coordinates and subchannel coordinates. Such a data region is allocated to uplink of a specific user or, in downlink, can be transmitted by a BS to a specific user. To define the data region in two-dimensional space, the number of OFDM symbols in a time domain and the number of successive subchannels starting at a position separated from a reference point by offset should be determined.

Frame Structure of OFDMA Physical Layer of Broadband Wireless Access System

FIG. 2 illustrates a frame structure of an OFDMA physical layer of a broadband wireless access system. A downlink sub-frame is started with a preamble used for synchronization and equalization in a physical layer A structure of the whole frame is defined through a DL-MAP message and a UL-MAP message of a broadcast form defining the locations and usage of bursts allocated to downlink and uplink.

The DL-MAP message defines usage allocated to each burst with respect to a downlink interval in a burst mode physical layer. The UL-MAP message defines usage of bursts allocated with respect to an uplink interval. Information elements constituting the DL-MAP message determine downlink traffic intervals of a user stage by a downlink interval usage code (DIUC), a CID, and location information of a burst including subchannel offset, symbol offset, the number of subchannels, and the number of symbols. Information elements constituting the UL-MAP message determine usage by an uplink interval usage code (UIUC) according to a CID and define a location of a corresponding interval by a 'duration'. Usage of each interval is determined according to a UIUC value used in the UL-MAP message and each interval is started with a point separated by 'duration' defined in the information elements of the UL-MAP message from a start point of previous information elements.

Ranging

In a process of performing the initial network registration procedure as illustrated in FIG. 1, a process of UE adjusting transmission parameters (frequency offset, time offset, transmission power, etc.) for uplink communication with the BS is called initial ranging. After the network registration procedure completed, the UE performs periodic ranging to continue to maintain uplink communication with the BS. In addition, ranging includes handover ranging for simplifying a procedure when the UE performs a handover operation and bandwidth request ranging for requesting an uplink bandwidth when data to be transmitted by the UE is generated.

In a broadband wireless access system, a code division multiple access (CDMA) code set used for ranging and a region for transmitting CDMA codes are allocated through UL-MAP by a network according to each ranging type. For handover ranging for example, a UE should request handover ranging by selecting a specific code among CDMA codes for the handover ranging and by transmitting the selected code to a network through initial ranging and handover ranging regions. By this method, the network can discriminate between ranging types through the received CDMA code and a CDMA code transmission region.

In IEEE 802.16 (refer to IEEE P802.16Rev2/ID2, "DRAFT Standard for Local and Metropolitan Area Networks Part 16: Air Interface for Broadband Wireless Access Systems", December, 2007), a ranging structure includes an initial/handover (HO) ranging and periodic/bandwidth request (BR) ranging, as illustrated in FIGS. 3*a* to 3*d*. To establish initial uplink time synchronization, a UE uses initial ranging. Handover ranging is used for handover. Time and frequency synchronization is updated through periodic ranging, and resources are requested through bandwidth request ranging. These four types of ranging have different codes. A ranging code is generated using a pseudorandom-noise (PN) code generation equation of $1+X^1+X^4+X^7+X^{15}$. A seed of such a pseudo random binary sequence (PRBS) uses {b14 ... b0=0, 0, 1, 0, 1, 0, 1, 1, s0, s1, s2, s3, s4, s5, s6}, where s6 denotes the least significant bit (LSB) of the PRBS seed, and s6:s0=UL_PermBase (where s6 is the most significant bit (MSB) of UL_PermBase. A total of 256 codes can be generated using the PN generation equation and theses codes are divided according to usage. The first N codes are used for initial ranging, the following M codes are used for periodic ranging, the next L codes are used for bandwidth request ranging, and the following O codes are used for handover ranging.

DISCLOSURE

Technical Problem

Problem of Conventional Ranging Structure

The conventional ranging structure has the following problems.

(1) A supportable cell size is limited.

According to, for example, 802.16m system requirements [802.16m-07/002r4], a cell radius up to 100 km can be supported. However, in the conventional ranging structure, a round trip delay which can be estimated is limited to one useful symbol $T_o$ (e.g., 91.43 μs), One example therefore is illustrated in FIG. 4a. Code Xs of two signals having a round trip delay of $T_o$ are identically received. Therefore, when these signals are received, the round trip delay cannot be estimated. FIG. 4b illustrates an example of a ranging structure using four symbols. As in the above-described example, since Code X and Code (X+1) of two signals having a round trip delay of $T_o$ coincide accurately, a round trip delay can not be estimated. Moreover, since phase discontinuity occurs between the first two symbols and the next two symbols, it is difficult to use this part for detection.

(2) Interference occurs both in data traffic and in other ranging codes.

An initial ranging structure in the IEEE 802.16e system (hereinafter, referred to as '802.16e' or '16e') conforms to a basic OFDMA structure without considering a transmission round trip delay. In other words, the ranging structure considers only a maximum delay spread without considering the round trip delay. Orthogonality between subcarriers within a symbol interval is destroyed by a round trip delay exceeding a length of cyclic prefix (CP) of a basic OFDMA structure. This is not just a problem of ranging codes and influences neighbor data traffic. In a partial usage of subchannel (PUSC) mode which does not use neighbor subcarriers, this orthogonality problem is severer. Since neighbor subcarriers in the PUSC mode are grouped in units of four, filtering is required in units of four subcarriers to prevent the above-described influence. When 144 ranging codes are used, a total of 36 bandpass filters in units of four filters is needed. However, such filtering is not desirable due to high complexity, hardware costs, etc. FIG. 5 illustrates interference between ranging codes.

(3) Quality of correlation characteristic is low.

In a conventional ranging structure, a long PN code is generated and the generated PN code is truncated for use as ranging codes. The truncated PN code is poor in a correlation characteristic. FIGS. 6a and 6b shows comparison of auto-correlation and cross-correlation characteristics of a 144-length code truncated from a conventional long PN code and a 139-length Zadoff-Chu (ZC) code. As can be seen from FIGS. 6a and 6b, a conventional (e.g., IEEE 802.16e) ranging code has a high side lobe of auto-correlation and a high cross-correlation characteristic compared with the ZC code. The high side lobe of auto-correlation may increase an error in estimating timing advance and the high cross-correlation restricts a permitted range of noise and interference.

A characteristic of actual mapping and processing is more important than a characteristic of codes. In 802.16e, a code is inserted in the frequency domain and then is transmitted. In this case, since a round trip delay occurs in the time domain, a BS should calculate a correlation value in the time domain. However, the PN code which is truncated for use and inserted in the frequency domain has a poor correlation value in the time domain. In particular, in the PUSC mode using random-like subcarriers which do not use adjacent subcarriers, such degradation in timing offset estimation and detection is substantial. FIGS. 7a and 7b illustrate correlation characteristics during exact mapping in a PUSC mode and an adaptive modulation and coding (AMC) mode, respectively.

An object of the present invention devised to solve the above-described problems lies in providing a new ranging structure which can estimate a round trip delay even in an extended cell radius environment.

Another object of the present invention is to provide a new ranging structure which can improve timing offset estimation performance by inserting a new code in the frequency domain and improving a correlation characteristic in the time domain.

A further object of the present invention is to provide a new ranging structure which can obtain preamble energy necessary for a receiving end while performing ranging.

Technical Solution

The object of the present invention can be achieved by extending a length in the time domain of a part (sequence part or preamble) occupied by a ranging sequence in a conventional ranging structure.

A method using a structure in which a length of a part occupied by a ranging sequence is extended in the time domain includes a method using a structure in which a preamble occupied by the ranging sequence is repeated two times or more, a method using a structure in which a length of a preamble occupied by the ranging sequence is extended in the time domain, and a method using a structure in which lengths of a cyclic prefix and/or guard time in the time domain are designed in consideration of a delay spread of a channel and a round trip delay.

In the present invention, subcarrier spacing of a ranging region is smaller than subcarrier spacing of a data region. In selecting the subcarrier spacing, oversampling for adjusting a sampling rate of a ranging structure and a sampling rate of a system may be designed by implementing discrete Fourier transform (DFT) of an integral size. In this case, a maximum residual frequency offset and a maximum supportable speed of a UE are considered so as to minimize an influence of a Doppler frequency.

In the present invention, a basic unit comprised of subcarriers to obtain frequency diversity may be designed not to be adjacent to each other in the frequency domain. When using multiple basic units, a BS may have substantial overhead to inform a UE of locations. Therefore, it is desirable that if the BS informs a UE of only one location of a basic unit, the other locations is selected by a predetermined rule. The basic unit may be one DRU (distributed resource unit) or one CRU (contiguous resource) in frequency domain. For the case where there is a large number of UEs and/or to reduce collision probability, and/or to increase opportunity, a plurality of ranging slots may be allocated in the frequency domain.

In the present invention, a sequence for ranging may use a conventional 16e code or a CAZAC-series sequence.

In one aspect of the present invention, a method for performing ranging in a broadband wireless access system using multi-carrier includes selecting, at a user equipment a ranging code and a time slot, and transmitting the selected ranging code at the selected time slot, wherein a ranging structure including the ranging code includes at least one of a cyclic prefix and a guard time, and a preamble including the ranging code, and a length of the ranging structure in a time region is longer than two predetermined successive OFDMA symbol periods.

In another aspect of the present invention, provided herein is a method for performing ranging in a broadband wireless access system using multi-carrier. The method includes receiving, by a base station, a ranging code, and performing ranging processing using the received ranging code, wherein a ranging structure including the ranging code includes at least one of a cyclic prefix and a guard time, and a preamble including the ranging code, and a length of the ranging structure in a time region is longer than two predetermined successive OFDMA symbol periods.

Advantageous Effects

According to the present invention, cell coverage can be extended. Since localized ranging per basic unit is used, frequency diversity can be obtained and a channel can be estimated over a broad bandwidth.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
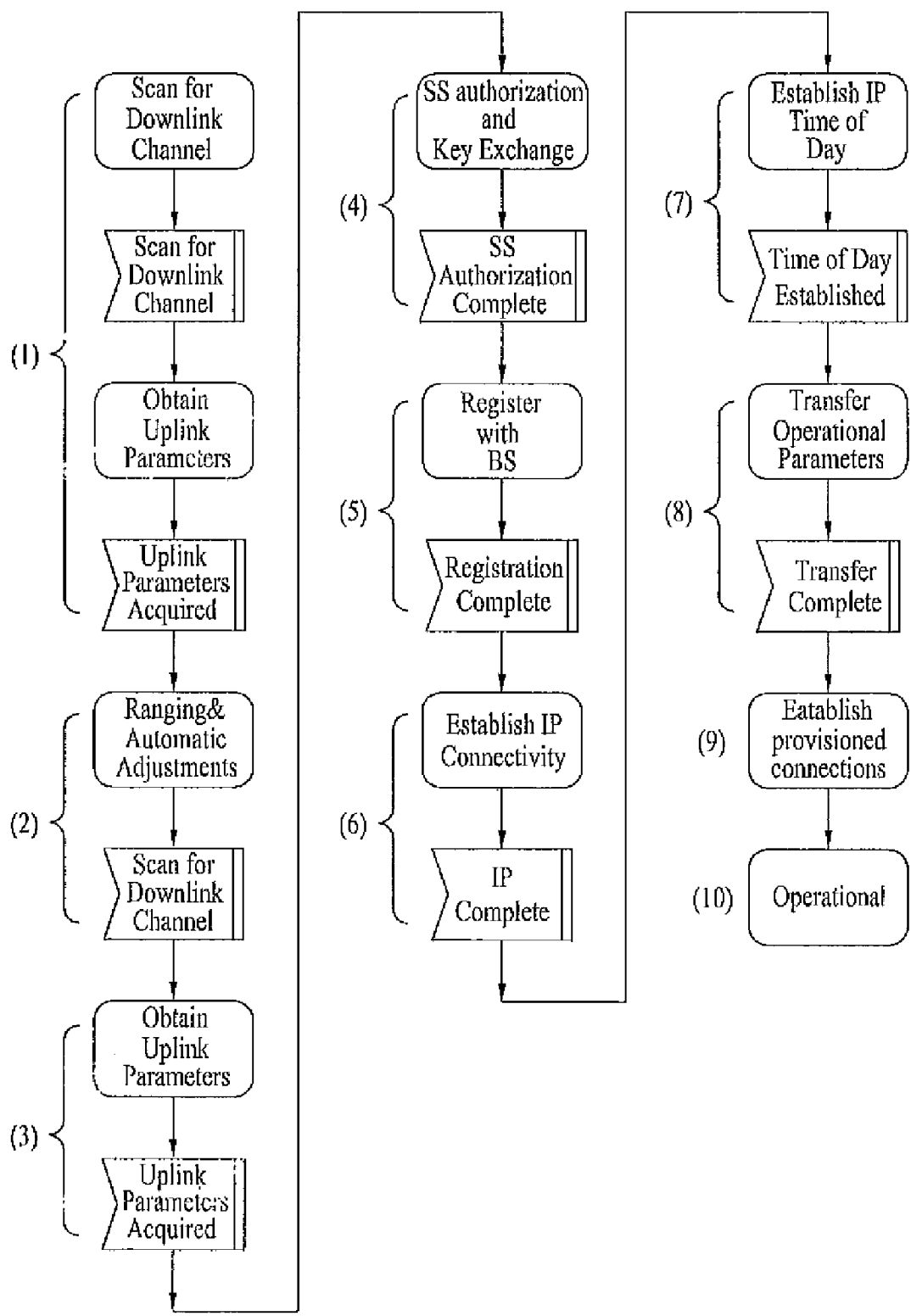
FIG. 1 is a flow chart illustrating a network entry procedure during initialization of a UE in a broadband wireless access system.
Figure 2:
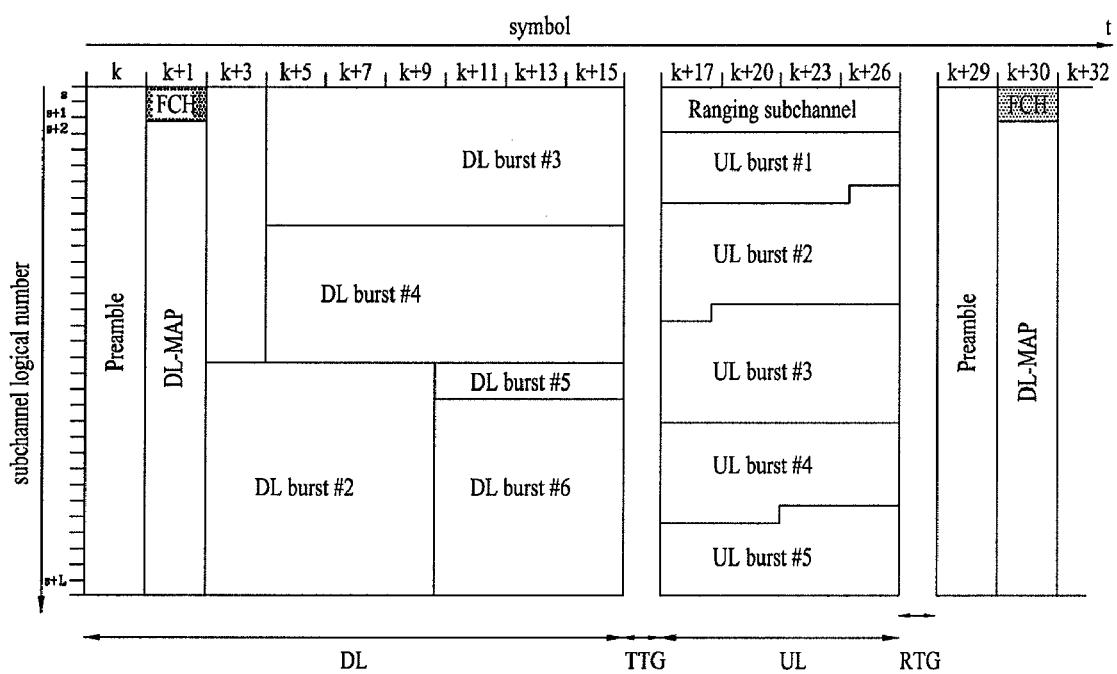
FIG. 2 illustrates a frame structure of an OFDMA physical layer of a broadband wireless access system.
Figure 3:
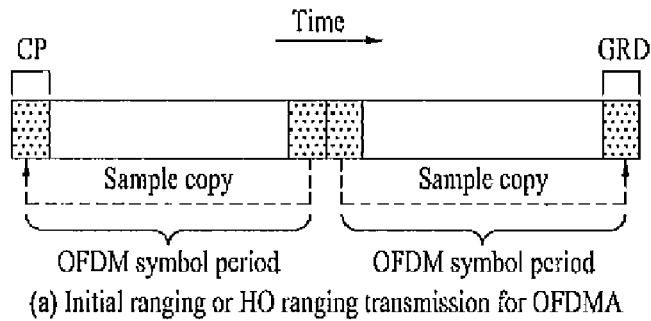
FIGS. 3a to 3d and FIGS. 4a and 4b illustrate ranging structures used for ranging transmission according to a prior art.
Figure 3:
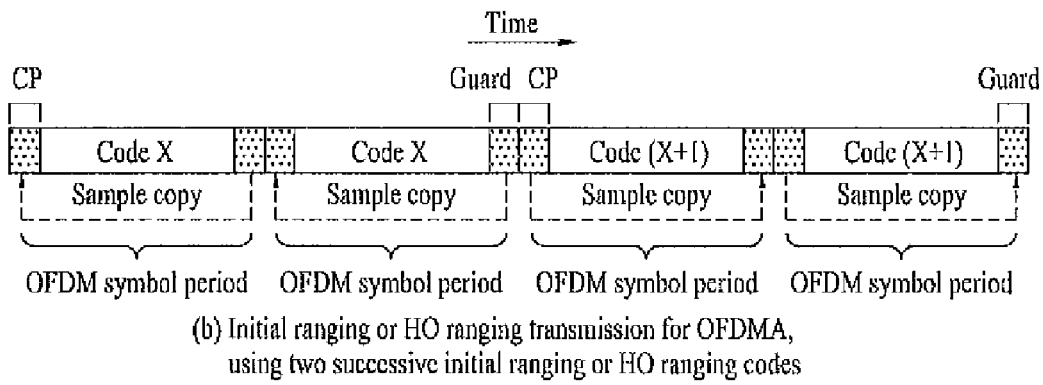
Figure 3:
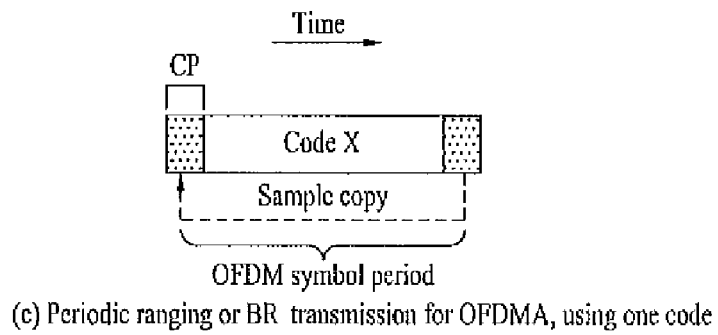
Figure 3:
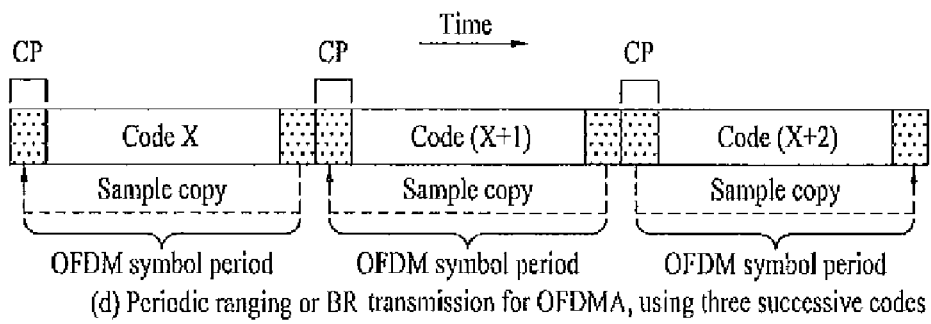
Figure 4:
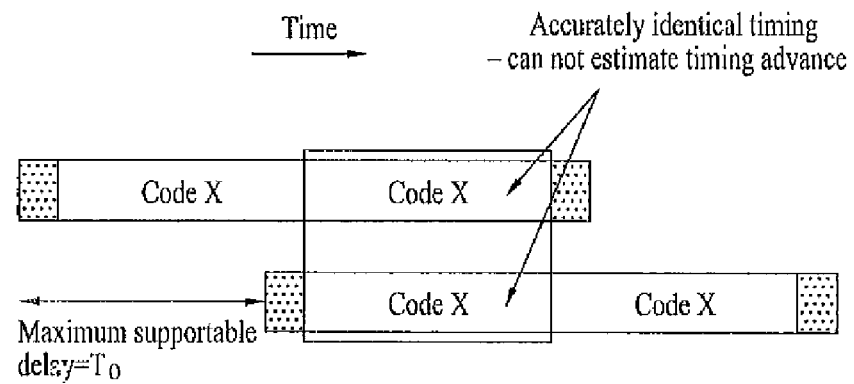
Figure 4:
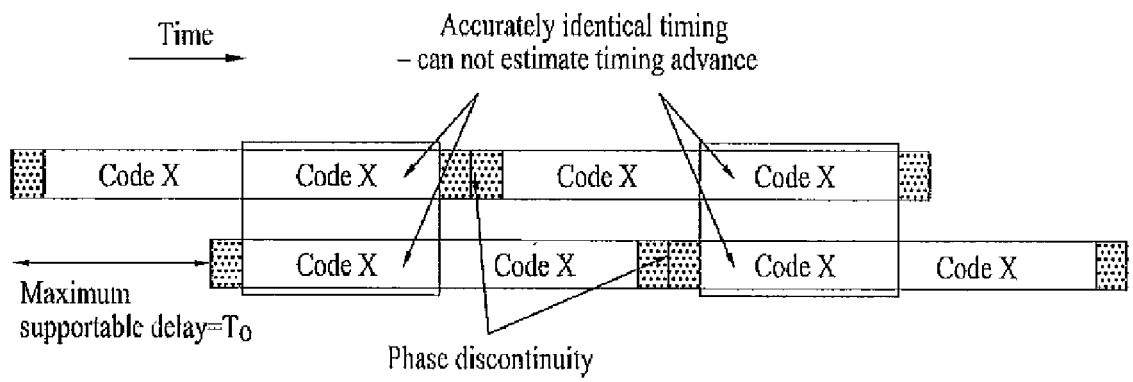
Figure 5:
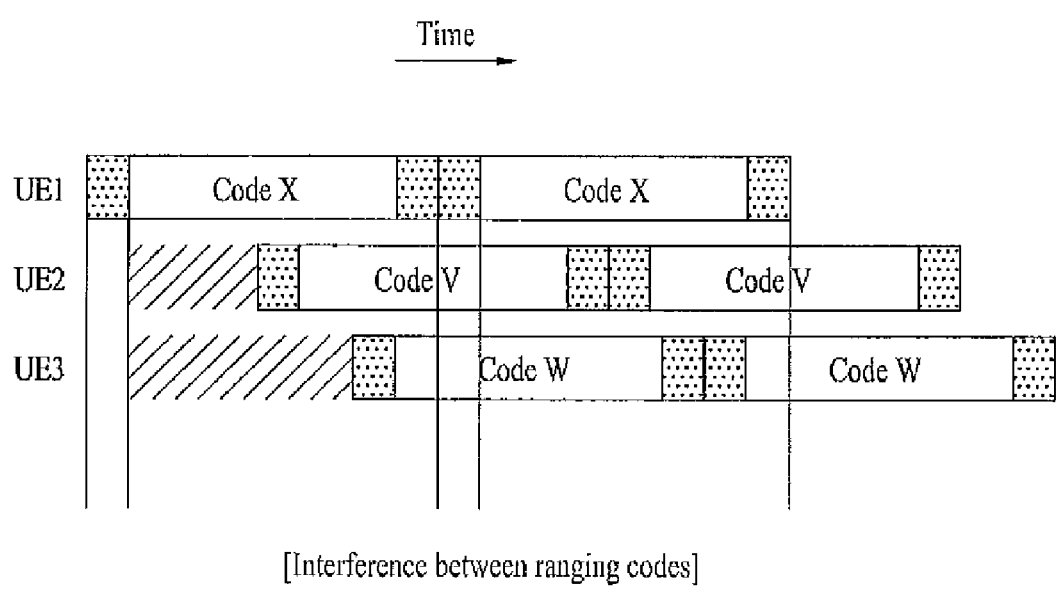
FIG. 5 illustrates interference between ranging codes.
Figure 6:
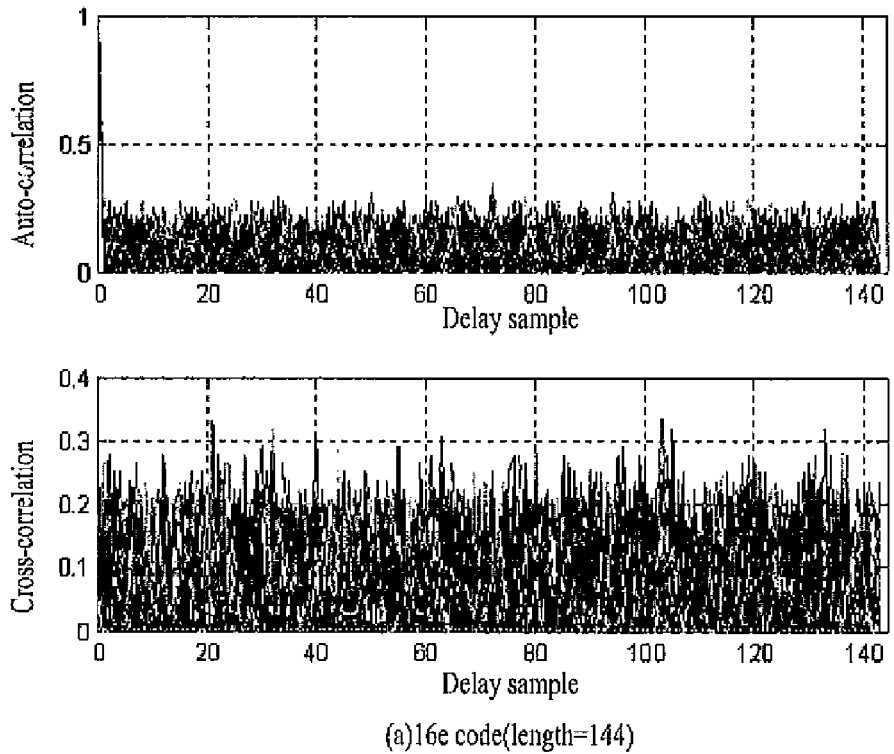
FIGS. 6a and 6b illustrate correlation characteristics of a ranging code.
Figure 6:
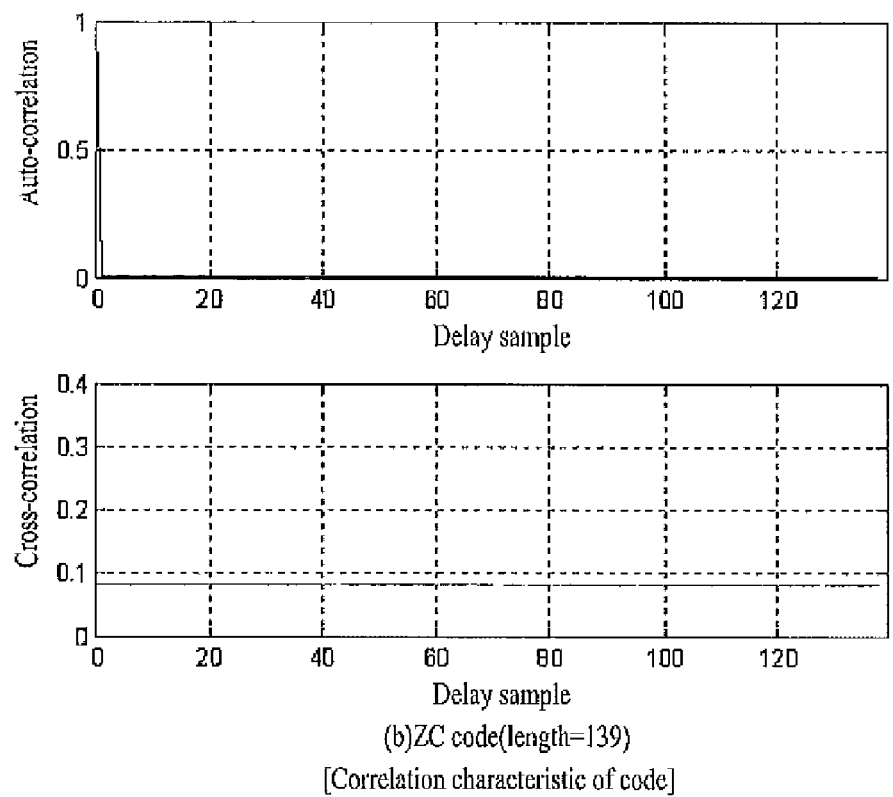
Figure 7A:
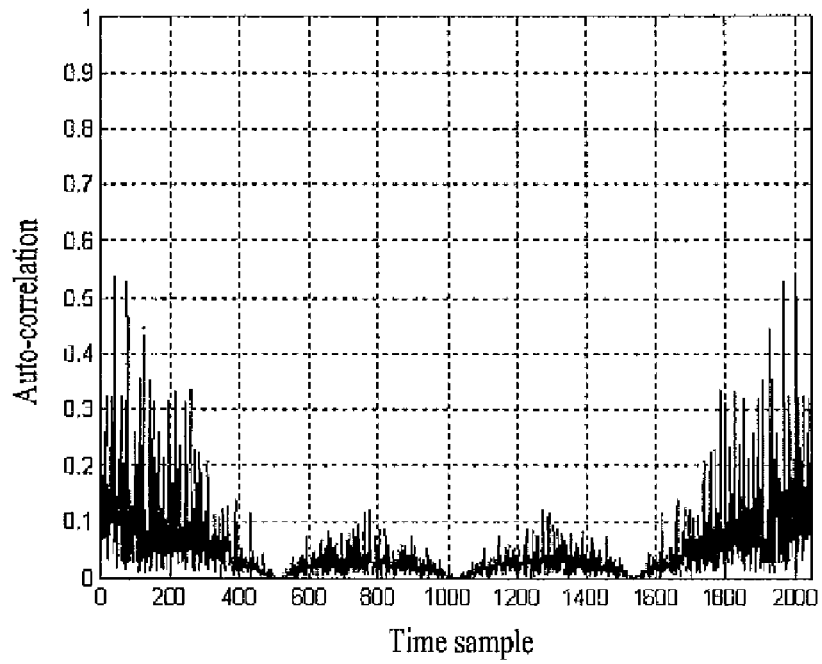
FIGS. 7a and 7b illustrate correlation characteristics during exact mapping of a ranging code.
Figure 7A:
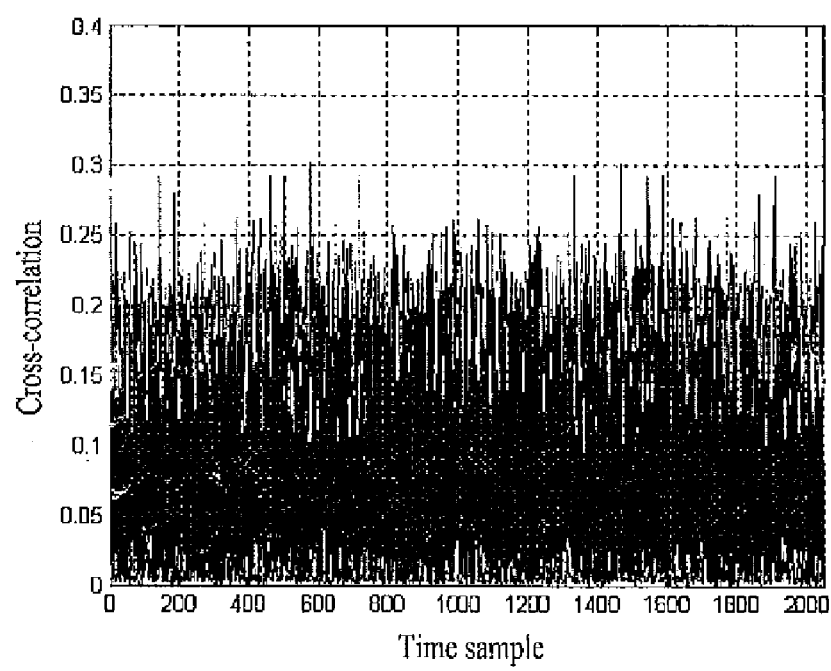
Figure 7B:
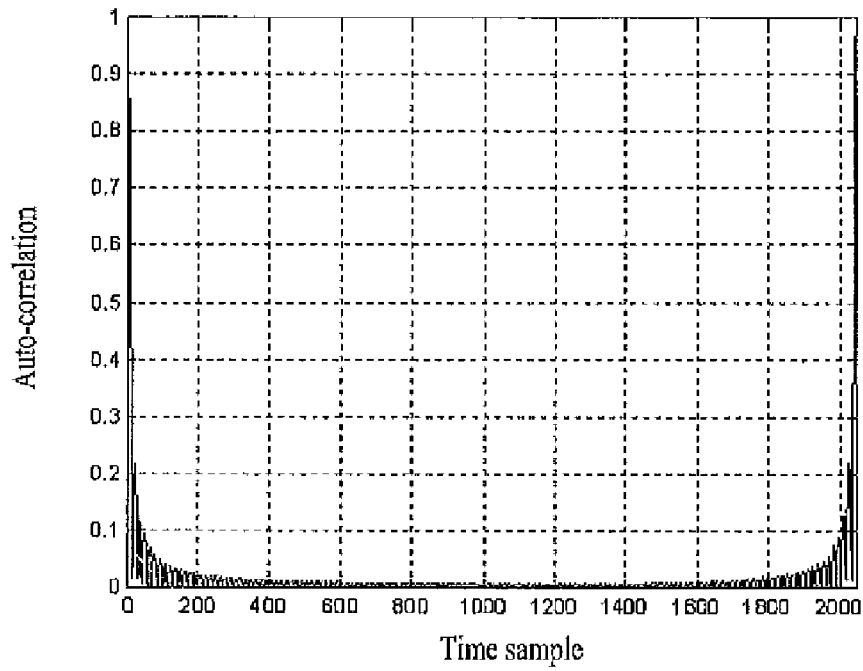
Figure 7B:
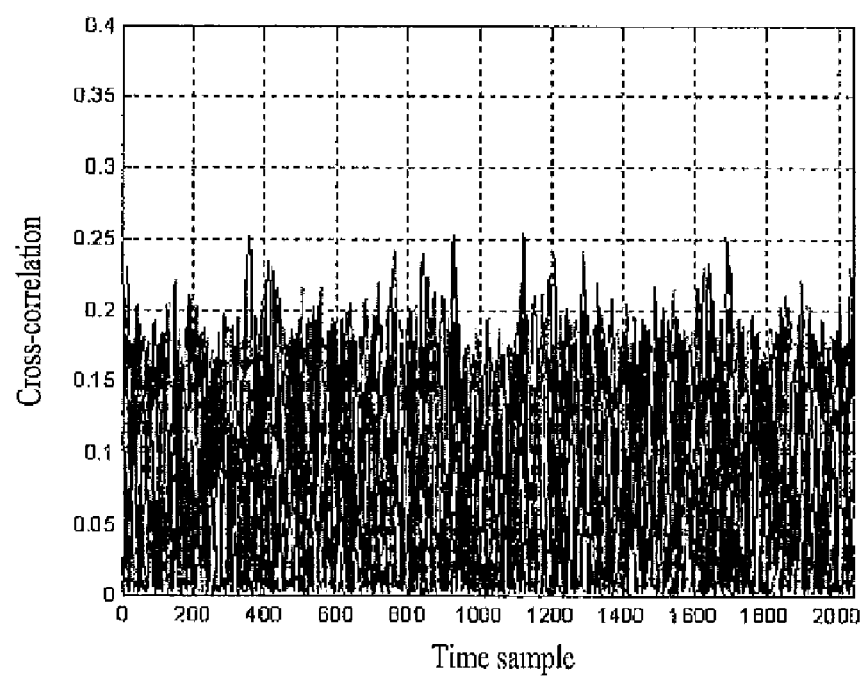

The construction, operation, and other features of the present invention will be easily appreciated from the exemplary embodiments of the present invention, examples of which are described with reference to the accompanying drawings. In the exemplary embodiments which will be described hereinafter, technical features of the present invention are applied to a broadband wireless access system as an example and may refer to IEEE Std 802.16e™, "IEEE Standard for Local and Metropolitan Area Networks, Part 16: Air Interface for Fixed and Mobile Broadband Wireless Access Systems" which provides a general description of a ranging method in the broadband wireless access system.

The present invention proposes a new ranging stricture in a multi-carrier system to solve problems of conventional ranging. A part occupied by an actually generated sequence is expressed by a sequence part or a preamble. However, the present invention is not restricted by such a term. A sequence may be detected by time domain detector or frequency domain detector. However, for simple implementation of a detection part, frequency detector processing may be supported. In the present invention, a description will be given in terms of frequency domain detector.

In the exemplary embodiments of the present invention, media access control (MAC) may define a single ranging channel, on uplink, comprised of one or more pairs of adjacent subcarriers. Transmission collision may occur on the ranging channel. A UE may randomly select one CDMA ranging code among proper sets defined for initial ranging, periodic ranging, and bandwidth request ranging. The CDMA ranging code may be replaced with a ZC sequence.

An initial ranging transmission may be performed by any UE desiring to be initially synchronized with a system channel. The initial ranging transmission may be performed during a plurality of successive OFDMA symbol periods. The identical CDMA ranging code may be transmitted on the ranging channel during two symbols. A phase between two adjacent symbols is successive. Periodic ranging transmission and bandwidth request ranging transmission may be performed only by a UE already UL synchronized with the system.

A UE obtains downlink synchronization and uplink transmission parameters from downlink control frames such as DL-MAP, UL-MAP, DCD and UCD of, for example, 802.16e, and then (a) randomly selects a ranging slot as a time for performing ranging and (b) selects a ranging code to transmit the ranging code to a BS at the selected ranging slot. If other MSs have not transmitted the same code at the same slot, the ranging code can successfully be received by the BS. Since the BS can not know which UE has transmitted a CDMA ranging request, the BS, which has successfully received the CDMA ranging code may broadcast a ranging response message (CDMA_Allocation_IE) informing the received ranging code as well as the ranging slot at which the CDMA ranging code has been received. The message allows the UE which has successfully transmitted the ranging code to identify itself. The ranging response message may include transmission control parameters (e.g., time, power, and frequency control) and status notification (e.g., success and failure), necessary for ranging by the UE.

Figure 8:
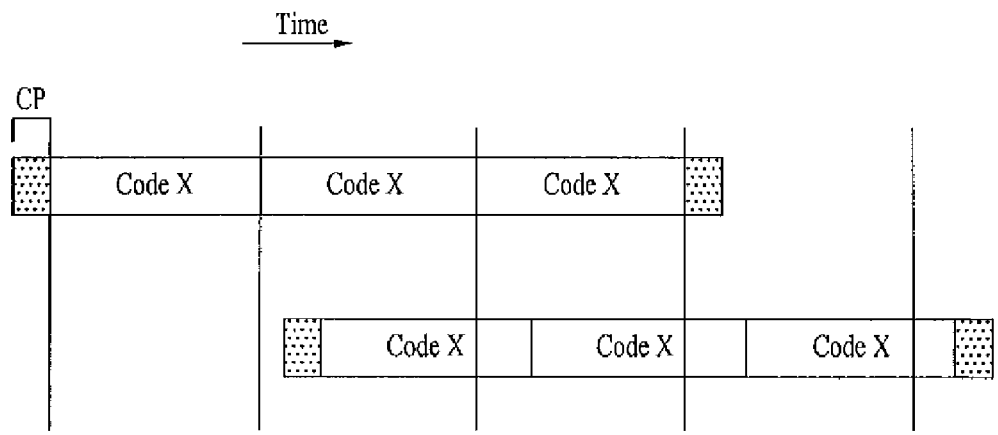
FIGS. 8a and 8b illustrate ranging structures in which a ranging code is repeated according to an exemplary embodiment of the present invention.
Figure 8:
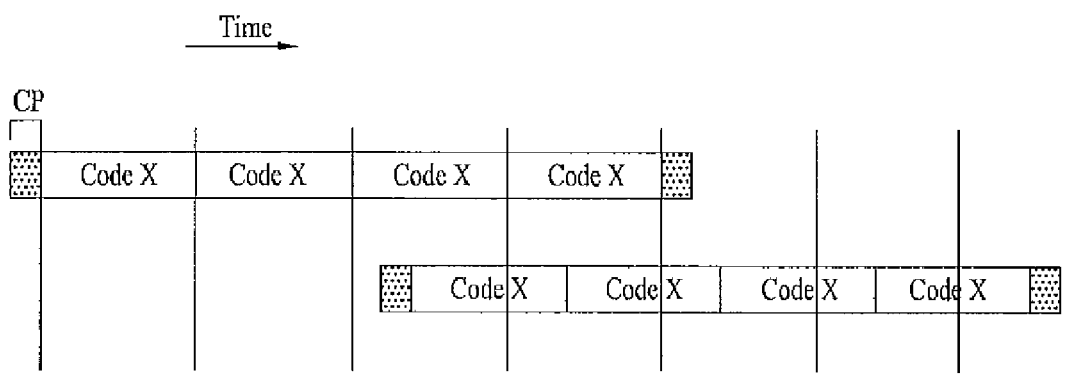

FIGS. 8a and 8b illustrate ranging structures for ranging processing according to an exemplary embodiment of the present invention. For timing estimation in a cell having a large delay, a repeated structure may be used. As illustrated in FIG. 8a, a code X part may be repeated. A BS may perform correlation in respective code X parts. In FIG. 8a, code X occupies three parts. If a peak is detected in the first and second parts in which correlation is performed by the BS, a delay time is less than one OFDMA symbol period. If a peak is detected not in the first part but in the second and third parts, a delay time is greater than one OFDMA symbol period. FIG. 8b illustrates a structure for estimating timing in a cell in which a delay greater than two OFDMA symbol periods occurs. According to a maximum supportable cell radius, the above structures in which a ranging code is repeated several times may be used.

Figure 9:
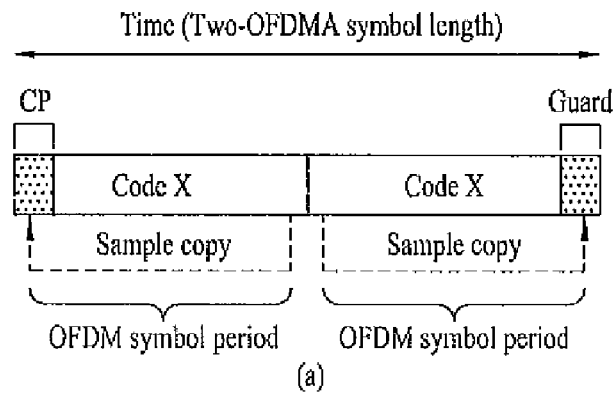
FIGS. 9a to 9c illustrate ranging structures in which a length of a ranging code is extended in the time domain according to an exemplary embodiment of the present invention.
Figure 9:
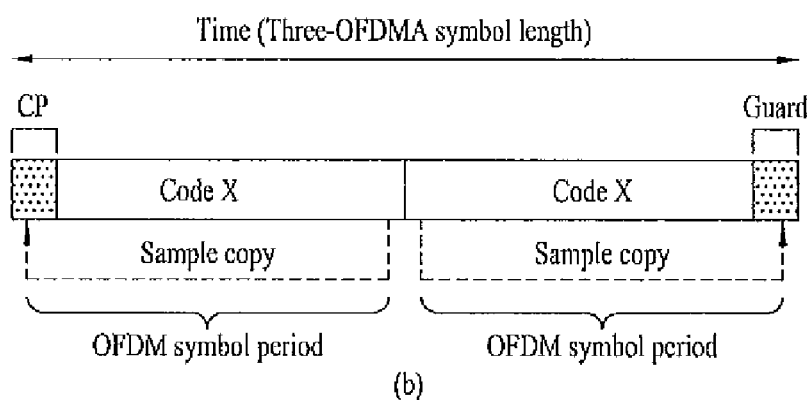
Figure 9:
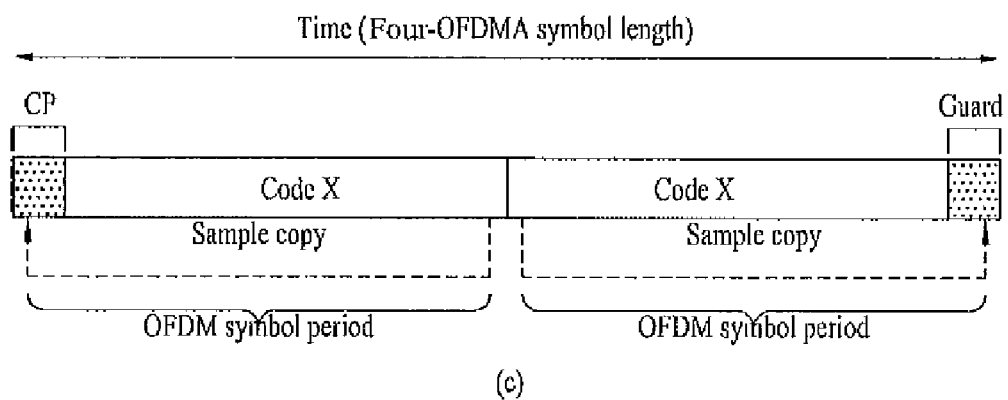

FIGS. 9a to 9c illustrate ranging structures used for ranging processing according to another exemplary embodiment of the present invention. A conventional basic ranging structure used for ranging processing may be extended in the time domain according to a cell size. The time form of the basic structure is used without change and the time domain is extended to an interval occupied by more OFDMA symbols than the two basic OFDMA symbols. The lengths of a ranging cyclic prefix (CP) and a guard interval may be fixed or extended. Since the time domain occupied by a code X is different, subcarrier spacing occupied by the code X becomes different. Accordingly, different sequences may be used in each structure. When using a code which is truncated from a long PN sequence as in 16e to a necessary length (e.g., 144), the sequence may be truncated to a length necessary for each structure. Alternatively, a sequence of a different length may be used in each structure.

When determining the lengths of a ranging CP and a guard time (GT), a round trip delay or a one-way trip delay is considered. However, if the ranging structure is designed as one structure according to a maximum supportable cell radius, unnecessary overhead is generated in a small cell. Therefore, it is desirable to design various structures according to a supportable cell radius.

Figure 10:
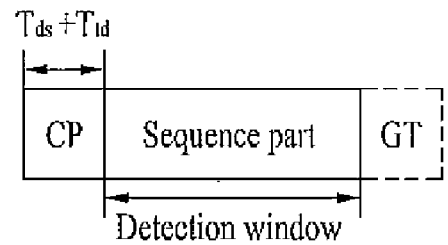
FIGS. 10a to 10c illustrate a ranging structure in which a length of a cyclic prefix (CP) or a guard time (GT) in the time domain corresponds to any one of a delay spread, a trip delay, and the sum of the delay spread and the trip delay, according to an exemplary embodiment of the present invention.
Figure 10:
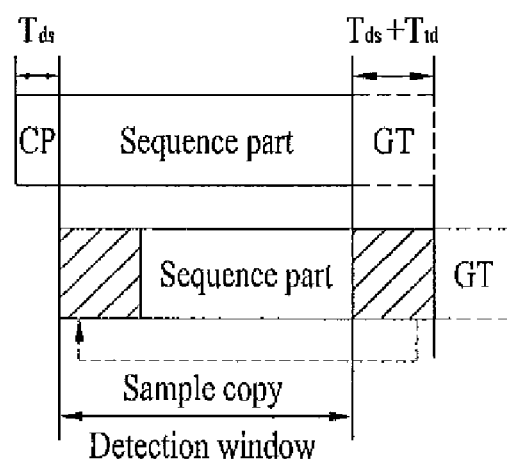
Figure 10:
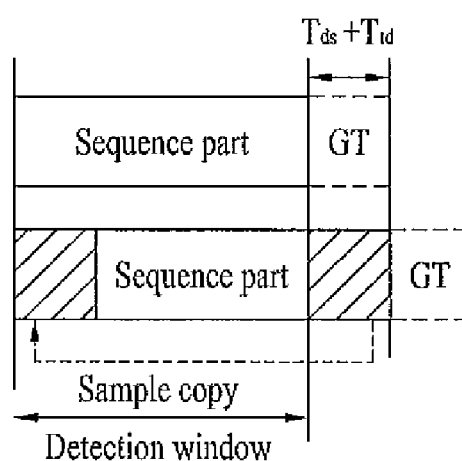

FIGS. 10a to 10c illustrate a ranging structure for ranging processing according to a further exemplary embodiment of the present invention. The ranging structure may use the following three types.

First, the ranging structure may have a construction of long ranging CP+sequence part+CT as illustrated in FIG. 10a. The long ranging CP is designed considering a delay spread of a channel and a trip delay. The delay spread indicates a delay time between the first received electromagnetic wave and the next reflected received electromagnetic wave via different paths in a multi-path environment of radio electromagnetic waves. The trip delay indicates a time taken to transmit a message to a destination from a remote place. The trip delay may consider a round trip delay or a one-way trip delay. The long ranging CP causes the delay spread and trip delay not to have an effect on the sequence part. The design of the GT considers only the trip delay since the delay spread of the channel is included in a data CP of the next symbol.

Second, the ranging structure may have a construction of short ranging CP+sequence part+GT as illustrated in FIG. 10b. The short ranging CP is designed considering the delay spread of the channel. The occurrence of the trip delay may influence the orthogonality of the sequence part. If necessary, however, orthogonality can be maintained by an overlapping and adding method at a receiving end.

Third, the ranging structure may have a construction of sequence part+GT as illustrated in FIG. 10c. This structure does not consider the ranging CP. The occurrence of the delay spread of the channel and the trip delay may influence the orthogonality of the sequence part. However, if necessary, orthogonality can be maintained by an overlapping and adding method at the receiving end.

In the present invention, a long ranging CP and a short ranging CP are identically denoted. The present invention is not restricted by the length of a ranging CP.

Figure 11:
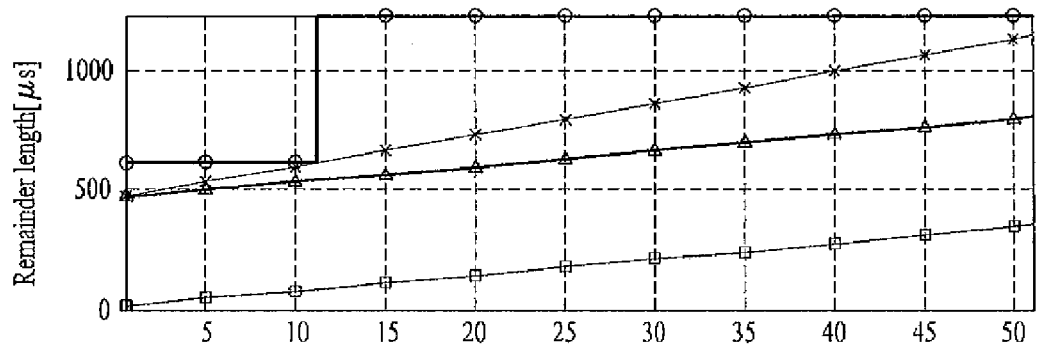
FIGS. 11a and 11b illustrate lengths of a CP, a sequence part, and a GT for a cell radius according to an exemplary embodiment of the present invention.
Figure 11:
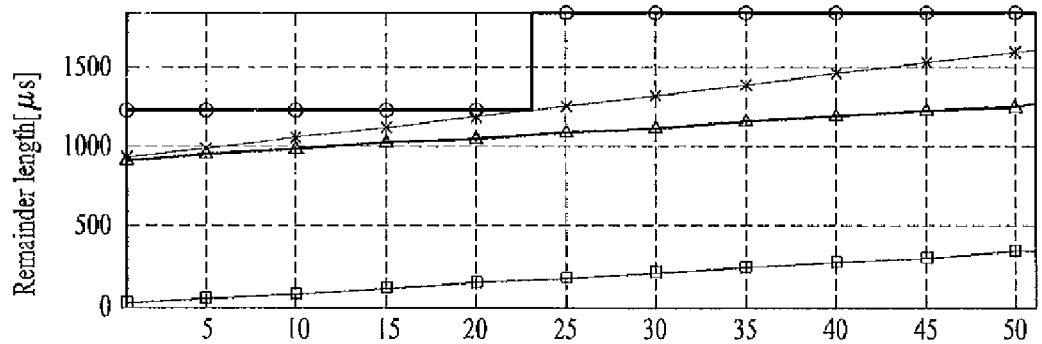
Figure 12:
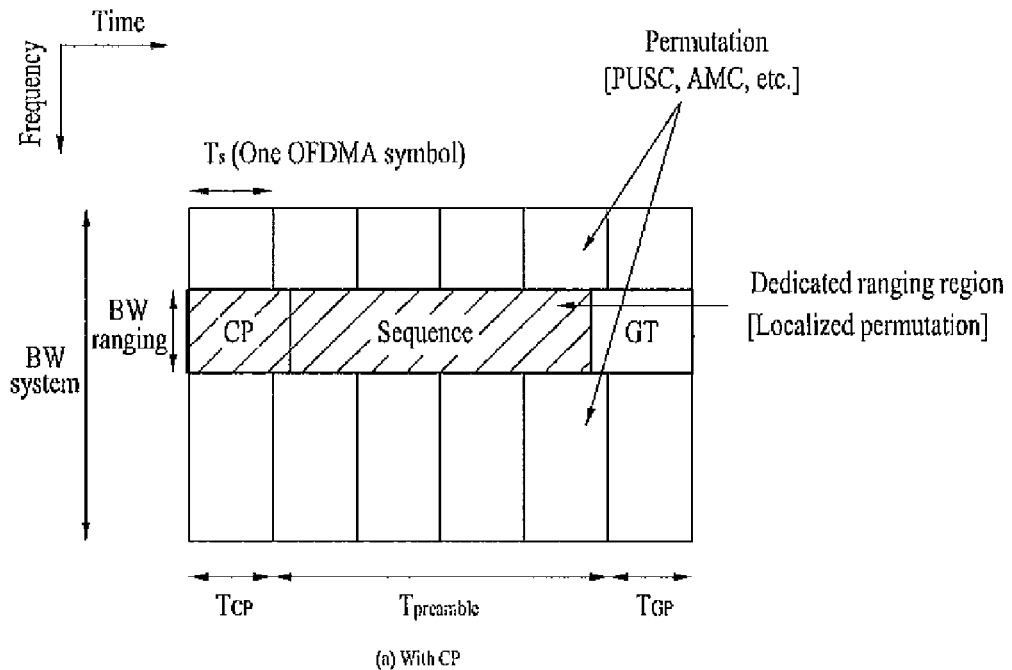
FIGS. 12a and 12b illustrate dedicated ranging structures with localized subcarrier allocation according to an exemplary embodiment of the present invention.
Figure 12:
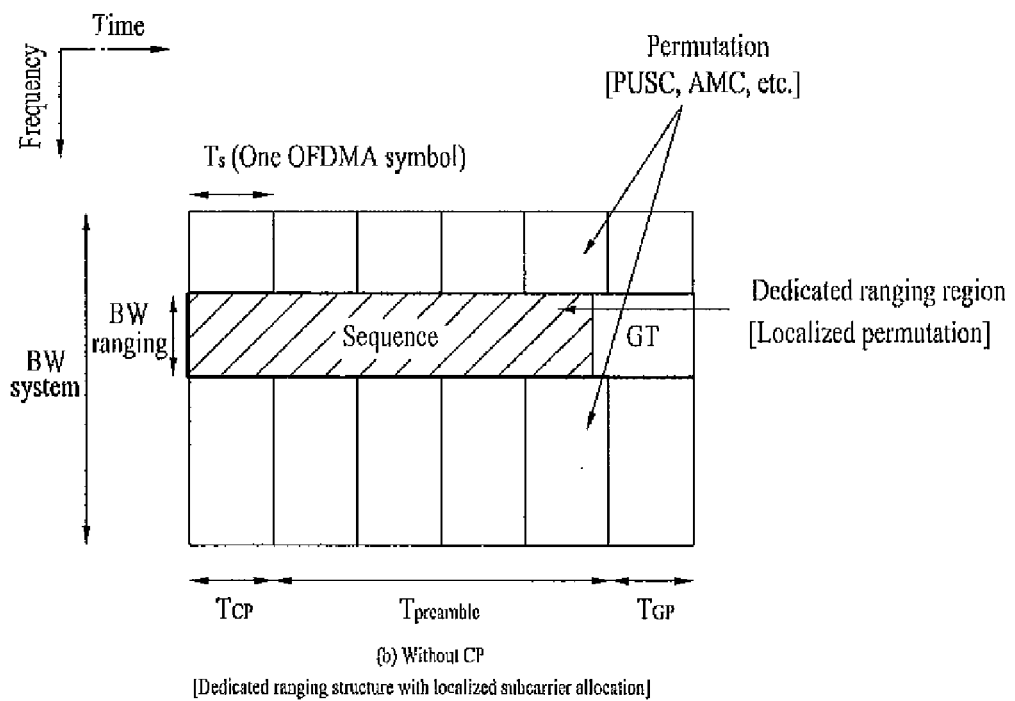

FIGS. 11a and 11b illustrate the lengths of a ranging CP, a sequence part, and a GT according to an exemplary embodiment of the present invention. FIGS. 12a and 12b illustrate dedicated ranging structures with localized subcarrier allocation according to an exemplary embodiment of the present invention. When using a ranging code transmission technique for maintaining continuity of a phase over multiple symbols, it is possible to adjust supportable timing offset estimation to a requirement level. Therefore, multiple basic OFDMA symbols within a specific bandwidth may be added to perform ranging using one long symbol. In FIGS. 12a and 12b, dedicated ranging regions using consecutive physical layer subcarriers are shown. One ranging symbol is constructed through multiple symbols by locally allocating a part of a whole system bandwidth for ranging.

For a simple configuration, minimum interference between cells, and simple timing advance estimation within a maximum supportable cell radius, it is desirable to use the same sequence length and a transmission time length of a sequence part irrespective of a cell radius. For example, a round trip delay in a maximum supportable cell radius of 50 km is 333.3556 μs. When considering a CP of ⅛ of a data part as a delay spread, a sequence time length should be 344.7856 μs. Accordingly, symbols greater than 3 OFDMA symbols are required as a sequence part. Since a subchannel, which is a resource allocation unit of 16e, is 3 OFDMA symbols, the time length of a basic ranging structure is desirably 6 OFDMA symbols. For instance, a basic ranging structure using 6 OFDMA symbols of a CP of 85.72 μs, a sequence part of 457.14 μs, and a GT of 74.30 μs can support a cell radius of up to 11.1 km. According to a resource allocation basic unit, namely, a subchannel or resource block (RB), of an IEEE 802.16m system (hereinafter, referred to as '16m'), the time length of such a basic ranging structure may be changed.

In this exemplary embodiment, one ranging symbol is comprised of 6 OFDMA symbols. An allocation method using subcarriers that are not adjacent to each other, for example, PUSC permutation, as well as an allocation method using adjacent subcarriers, for example, AMC permutation, may be used in a region except for the ranging region. The above two methods may be used simultaneously. In this case, subcarrier spacing of the ranging region is changed to $1/T_{seq}$. The subcarrier spacing may be selected as follows. First, oversampling for controlling a sampling rate of a ranging structure and a sampling rate of a system may be processed by DFT of an integral size. Further, the size of DFT may be multiplication of a multiple of prime numbers for fast DFT processing. As such an example, subcarrier spacing as listed in the following Table 1 may be used. In Table 1, To denotes a time length during which a sequence is transmitted.

TABLE 1

| | | |
|---|---|---|
| To = 714.2857142857 [us] | SubCarrier Spacing = 1.4000 [kHz] | DFT = 8000 [point] |
| To = 640.0000000000 [us] | SubCarrier Spacing = 1.5625 [kHz] | DFT = 7168 [point] |
| To = 625.0000000000 [us] | SubCarrier Spacing = 1.6000 [kHz] | DFT = 7000 [point] |
| To = 571.4285714286 [us] | SubCarrier Spacing = 1.7500 [kHz] | DFT = 6400 [point] |
| To = 558.0357142857 [us] | SubCarrier Spacing = 1.7920 [kHz] | DFT = 6250 [point] |
| To = 500.0000000000 [us] | SubCarrier Spacing = 2.0000 [kHz] | DFT = 5600 [point] |
| To = 457.1428571429 [us] | SubCarrier Spacing = 2.1875 [kHz] | DFT = 5120 [point] |
| To = 446.4285714286 [us] | SubCarrier Spacing = 2.2400 [kHz] | DFT = 5000 [point] |
| To = 400.0000000000 [us] | SubCarrier Spacing = 2.5000 [kHz] | DFT = 4480 [point] |

Second, the subcarrier spacing may be designed to minimize an influence of a Doppler frequency. If an influence of the Doppler frequency is over half of subcarrier spacing, the location of a correlation peak in a receiving end may vary. Accordingly, the subcarrier spacing may be designed considering a maximum residual frequency offset which may be generated in the system and a maximum supportable speed of a UE. For example, it is assumed that the maximum residual frequency offset is 2 percent of the data subcarrier spacing and the maximum supportable speed of the UE is 350 km/h. When considering a central frequency of 2.5 GHz, a maximum of 1.0289 kHz may be generated as the Doppler frequency. Therefore, the subcarrier spacing may be over 2.0578 kHz or so corresponding to twice the Doppler frequency. If the subcarrier spacing is designed by such a construction, another specific structure such as a restricted set for high speed as in $3^{rd}$ generation partnership project (3GPP) long term evolution (LTE) is not necessary. As such an example, the following subcarrier spacing may be used. The fowling Table 2 shows subcarrier spacing considering the Doppler frequency. In Table 2, $T_o$ indicates a time length during which a sequence is transmitted.

TABLE 2

| | | |
|---|---|---|
| To = 500.0000000000 [us] | SubCarrier Spacing = 2.0000 [kHz] | DFT = 5600 [point] |
| To = 457.1428571429 [us] | SubCarrier Spacing = 2.1875 [kHz] | DFT = 5120 [point] |
| To = 446.4285714286 [us] | SubCarrier Spacing = 2.2400 [kHz] | DFT = 5000 [point] |
| To = 400.0000000000 [us] | SubCarrier Spacing = 2.5000 [kHz] | DFT = 4480 [point] |

If the ranging subcarrier spacing of 2.1875 kHz is used, a basic ranging structure using 6 OFDMA symbols of a CP of 85.70 μs, a sequence part of 457.14 μs, and a GT of 74.31 μs may support a cell radius of up to 11.1 km. According to a resource allocation unit, i.e., a subchannel or RB, of 16m, the time length of the basic ranging structure may be changed.

Uplink symbol timing accuracy should be less than (Tb/32)/4 by a WiMAX profile. Tb indicates a duration of OFDMA symbols which do not include a CP. Assuming that the OFDMA symbol duration Tb in 16e is 91.4 μs, ranging should be transmitted through a frequency region greater than 1.4 MHz in the frequency domain. For example, ranging should be performed through 720 subcarriers over a frequency bandwidth of 15.75 MHz with the ranging subcarrier spacing of 2.1875 kHz. In this case, a code of a length approximating to 720 may be selected.

A method disclosed in Korean Patent Application No. 10-2007-0121465 (hereinafter, referred to as '10-2007-0121465 invention'), assigned to the same assignee as the present invention, may be applied. The 10-2007-0121465 invention provides a method for constructing a preamble of a random access channel (RACH) according to a cell radius of a BS without considering the length of a GT in a wireless communication system. The method for constructing the preamble of the RACH includes acquiring CP time length information according to a cell radius of a BS, acquiring sequence time length information for one sequence or repeated sequences, and constructing the preamble using the CP time length information and the sequence time length information without considering time length of a CT. Although the 10-2007-0121465 invention has a maximum supportable cell radius of 100 km, the preamble construction may be designed to be suitable for a maximum supportable cell radius of 50 km in 16m.

FIG. 11a illustrates a CP, a sequence part, a GT, and an entire ranging length according to a cell radius for a sequence part of 457.14 μs. FIG. 11b illustrates a CP, a sequence part, a GT, and an entire ranging length when a basic sequence part is repeatedly used. The following configuration set may be possible using the 10-2007-0121465 invention. A basic structure includes 6 symbols having a CP of 85.70 μs, a sequence part of 457.14 μs, and a CT of 74.31 μs. Since the CT has no actually transmitted part, the GT is not specified. A CP supporting a maximum supportable cell radius of 50 km is signaled irrespective of whether a sequence is repeated. Such a CP corresponds to 344.79 μs in time. Whether to repeat the sequence is signaled. A structure of sequence repetition uses 18 OFDMA symbols in 50 km. A short CP which can use 12 OFDMA symbols is additionally signaled. Accordingly, four cases indicating three CP lengths and indicating whether or not a sequence is repeated, and a sequence without repetition can be configured by 2 bits. In the following Table 3, format 0 indicates a basic structure occupying 6 OFDMA symbols. Format 1 occupies 12 or 18 OFDMA symbols and can support up to a cell radius of 50 km. Format 2 indicates a structure having a repeated code part and occupying 18 OFDMA symbols and can support up to a cell radius of 50 km. Format 3 indicates a structure which can use less resources with a repeated code part and occupies 12 OFDMA symbols.

TABLE 3

| Format | $T_{CP}$ | $T_{PRE}$ | $T_{GT}$ | $T_{RA}$ | Max. supportable cell radius |
|---|---|---|---|---|---|
| 0 | 85.70 μs | 457.14 μs | 74.31 μs | 617.16 μs | 11.1 km |
| 1 | 344.79 μs | 457.14 μs | 432.39 μs | 1234.32 μs or 1851.48 μs | 50 km |
| 2 | 344.79 μs | 2 × 457.14 μs | 592.41 μs | 1851.48 μs | 50 km |
| 3 | 165.71 μs | 2 × 457.14 μs | 154.33 μs | 1234.32 μs | 23.14 km |

In Table 3, a GT without the need to signal and specify are not shown. $T_{RA}$ is not necessary to signal and specify.

The maximum length of a usable sequence becomes $BW_{ranging}/(1/T_{seq})$ and a sequence equal to or shorter than $BW_{ranging}/(1/T_{seq})$ can be used. Alternatively, a sequence longer than $BW_{ranging}/(1/T_{seq})$ may be generated so as to be used suitably for a necessary length by truncating the sequence. To prevent interference with an adjacent band at both ends of a frequency of a dedicated region, a short sequence with a guard subcarrier may be used.

In terms of simply supporting various system bandwidths and/or due to a hardware problem, the time length of a CP may vary. However, a variation in the time length of the CP to some degree does not affect the spirit of the present invention.

For example, the time length of the CP may be adjusted by the relationship of sampling frequencies. The sampling frequency of a system may be varied. Namely, it is considered that the case where operations are all performed at the system sampling frequencies of 5.6 MHz, 11.2 MHz, and 22.4 MHz. The sampling frequencies are related such that one sampling frequency is a multiple of another sampling frequency. Four times 5.6 MHz is 22.4 MHz, two times 11.2 MHz is 22.5 MHz, and two times 5.6 MHz becomes 11.2 MHz. Like a multiple relationship of the sampling frequencies in various operation bandwidths, the number of samples of the CP may be a multiple of two or four. Such an example is shown in Table 4. In Table 4, numbers in parentheses indicate the number of samples in a system bandwidth of 20 MHz. A time length may be calculated by multiplying the reciprocal of a system sampling frequency by the number of samples.

TABLE 4

| Format | $T_{CP}$ | $T_{PRE}$ | $T_{GT}$ | $T_{RA}$ |
|---|---|---|---|---|
| 0 | 85.71 μs (1920 samples) | 457.14 μs (10239 samples) | 74.30 μs | 617.16 μs |
| 1 | 344.82 μs (7724 samples) | 457.14 μs (10239 samples) | 432.36 μs or 1049.5 μs | 1234.32 μs or 1851.48 μs |
| 2 | 344.82 μs (7724 samples) | 2 × 457.14 μs (2 × 10239 samples) | 592.38 μs | 1851.48 μs |
| 3 | 166.07 μs (3720 samples) | 2 × 457.14 μs (2 × 10239 samples) | 153.97 μs | 1234.32 μs |

As another embodiment of the present invention, the time length of the CT may be modified considering relationship with a sampling frequency (e.g., $f_{IFT}$) of an RACH sequence in addition to the above-described embodiment. The RACH sequence may be generated by performing small inverse discrete Fourier transform (IDFT), upsampling to a system bandwidth, and frequency-conversion into a central frequency demanded in the time domain, namely, by generation of hybrid frequency/time domain. Assuming that subcarrier spacing used in an RACH is 2.1875 kHz and the first inverse fast Fourier transform (IFFT) size is 1024, the sampling frequency $f_{IFT}$ is 2.24 Msps. When applying the above-described reason, the number of samples of the CP should be a multiple of 10. To simultaneously satisfy two multiple conditions, the number of samples of the CP should be a multiple of 40. Therefore, the length of the CP may be adjusted by the sampling frequency and the sampling frequency of the RACH sequence. Such examples are illustrated below in Table 5 and Table 6.

TABLE 5

| Format | $T_{CP}$ | $T_{PRE}$ | $T_{GT}$ | $T_{RA}$ |
|---|---|---|---|---|
| 0 | 85.71 μs (1920 samples) | 457.14 μs (10239 samples) | 74.30 μs | 617.16 μs |
| 1 | 344.64 μs (7720 samples) | 457.14 μs (10239 samples) | 432.54 μs or 1049.7 μs | 1234.32 μs or 1851.48 μs |
| 2 | 344.64 μs (7720 samples) | 2 × 457.14 μs (2 × 10239 samples) | 592.56 μs | 1851.48 μs |
| 3 | 166.07 μs (3720 samples) | 2 × 457.14 μs (2 × 10239 samples) | 153.97 μs | 1234.32 μs |

TABLE 6

| Format | $T_{CP}$ | $T_{PRE}$ | $T_{GT}$ | $T_{RA}$ |
|---|---|---|---|---|
| 0 | 85.71 μs (1920 samples) | 457.14 μs (10239 samples) | 74.30 μs | 617.16 μs |
| 1 | 346.42 μs (7760 samples) | 457.14 μs (10239 samples) | 430.76 μs or 1047.9 μs | 1234.32 μs or 1851.48 μs |
| 2 | 346.42 μs (7760 samples) | 2 × 457.14 μs (2 × 10239 samples) | 590.78 μs | 1851.48 μs |
| 3 | 166.07 μs (3720 samples) | 2 × 457.14 μs (2 × 10239 samples) | 153.97 μs | 1234.32 μs |

Figure 13:
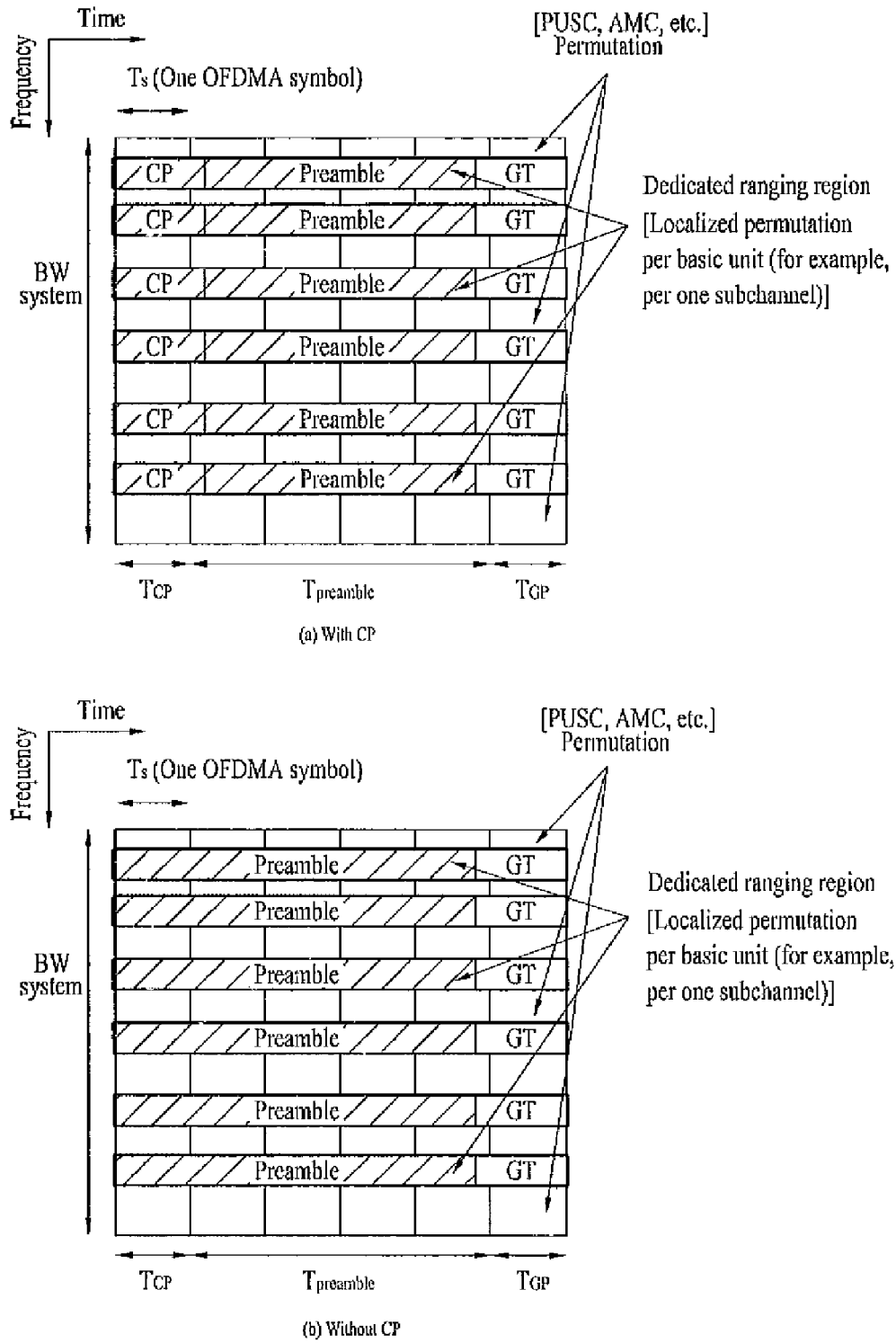
FIGS. 13a and 13b illustrate dedicated ranging structures with localized subcarrier allocation per basic unit according to an exemplary embodiment of the present invention.

FIGS. 13a and 13b illustrate dedicated ranging structures with localized subcarrier allocation per basic unit according to an exemplary embodiment of the present invention. The previously described method using the dedicated ranging structure with localized subcarrier allocation employs a dense frequency domain and therefore frequency diversity can not be obtained. To obtain frequency diversity, a widely spread structure in the frequency domain is required. A currently used structure is continuous only in units of four subcarriers and interference may occur in adjacent channels. Moreover, filtering in units of four subcarriers is not desirable because it requires substantial hardware costs. Accordingly, to save filtering costs and to reduce interference between adjacent channels, a method may be used employing adjacent subcarriers of a specific basic unit and employing subcarriers which are not adjacent to each other between basic units. The basic unit may be a multiple of a basic unit of resource allocation. The basic unit in frequency domain may be 'a subchannel (=18 data subcarriers)' of 16e or 'an RB (=12 data subcarriers)' of LTE or 'a UL tile (4 or 6 data subcarriers)' of 16e/16m or 'a DRU (distributed resource unit) (=6 data subcarriers) or a CRU (contiguous resource unit) (=18 data subcarriers)' of 16m. In a 16e PUSC mode, one subchannel may adjacently use a multiple of 24 subcarriers as 4 subcarriers×6 tiles. In an AMC mode, one subchannel may adjacently use a multiple of 18 subcarriers as 9 subcarriers×2 bins. The number of subcarriers indicates the number of subcarriers in a basic structure. Even though the same frequency region is used during transmission over a long time region, the number of subcarriers may vary. Adjacent subcarriers within one subchannel are used in the frequency domain and respective subchannels may be constructed not to be adjacent to each other in the frequency domain. Since a ranging signal can be transmitted over a broad bandwidth through such a construction, frequency diversity can be obtained and a BS can perform channel estimation for scheduling. Furthermore, since a ranging channel does not require frequency hopping, signaling overhead can be reduced and it is not necessary to know a bopping position of an adjacent cell during handover.

The subcarrier spacing of the ranging region is changed to $1/T_{seq}$. The length of a usable sequence is $BW_{ranging}/(1/T_{seq})$ and a sequence equal to or shorter than $BW_{ranging}/(1/T_{seq})$ may be used. Alternatively, a sequence longer than $BW_{ranging}/(1/T_{seq})$ may be generated so as to be used suitably for a necessary length by truncating the sequence. To prevent interference with adjacent bandwidths at both ends of a frequency of a localized region, a short sequence with a guard subcarrier may be used.

Figure 14:
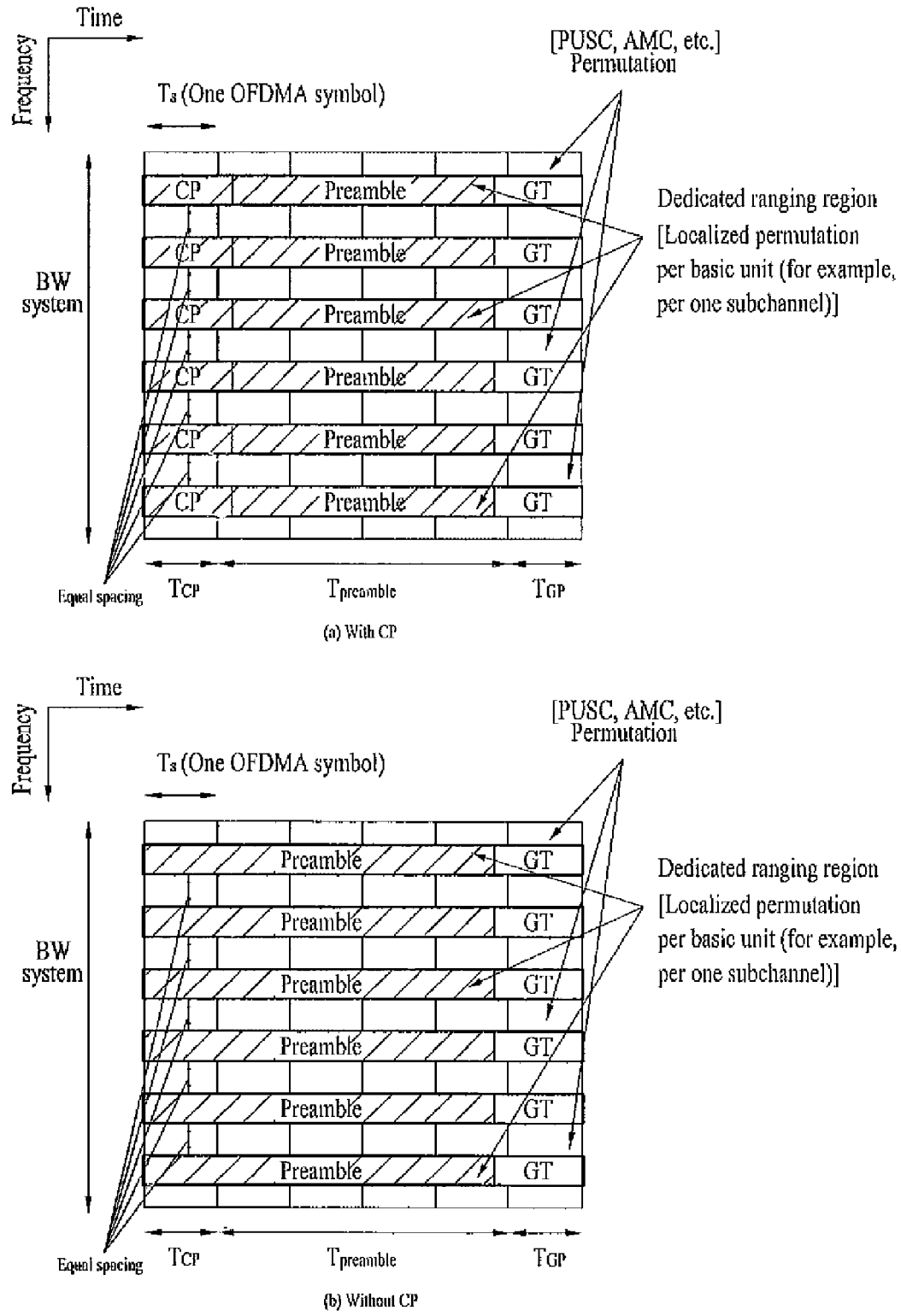
FIGS. 14a and 14b illustrate dedicated ranging structures with localized subcarrier allocation per predefined basic unit according to an exemplary embodiment of the present invention.

FIGS. 14a and 14b illustrate dedicated ranging structures with localized subcarrier allocation per predefined basic unit according to an exemplary embodiment of the present invention. This embodiment uses the equal spacing or a predefined position in the above-described dedicated ranging structure with localized subcarrier allocation per basic unit. Multiple basic units are used in the dedicated ranging structure with localized subcarrier allocation per basic unit, significant overhead may be generated when a BS informs a UE of multiple positions. Accordingly, it is desirable that if the BS informs the UE of only one position through a simple indication, the other positions are selected by a predetermined rule. As such a rule, spacing between basic units (e.g., subchannels) may be uniformly separated. The spacing may be uniform irrespective of a system bandwidth. For example, the spacing may be determined as a function of the number of ranging subchannels and the total number of subchannels at a minimum supportable system bandwidth. The minimum supportable system bandwidth indicates the smallest bandwidth among various bandwidths supported in a system. For instance, since IEEE 802.16m supports a system bandwidth of 5 MHz to 20 MHz, the minimum supportable bandwidth is 5 MHz. In this case, a region over the entire bandwidths of the currently supported system bandwidth is allocated for ranging. In a bandwidth greater than the above-described bandwidth, frequency hopping for frequency diversity may be performed.

Alternatively, the spacing may be increased in proportion to the system bandwidth. For example, the spacing may be determined as a function of the number of ranging subchannels and the total number of subchannels at a current system bandwidth. In this embodiment, a region over the entire bandwidths of the system bandwidth is allocated for ranging.

A specific position may be detected using already known information rather than equal spacing.

Signaling overhead may be reduced using successive logical subchannels.

Figure 15:
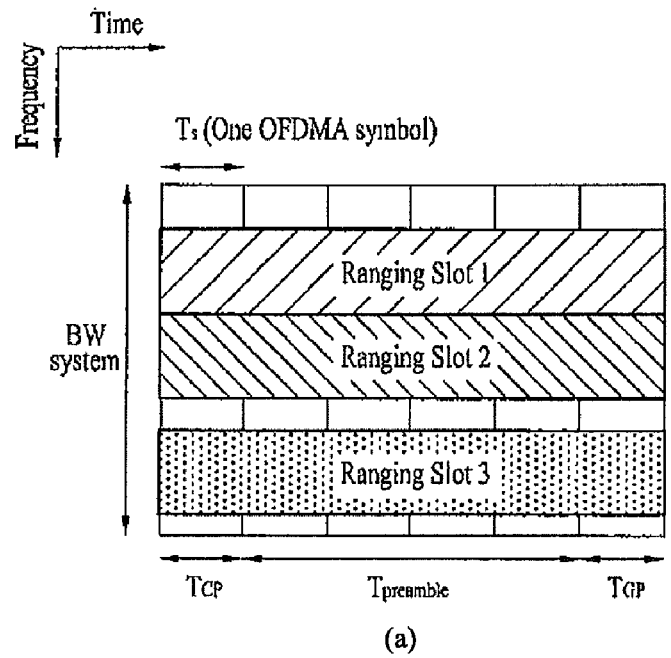
FIGS. 15a and 15b illustrate structures of a plurality of ranging slots according to an exemplary embodiment of the present invention.
Figure 15:
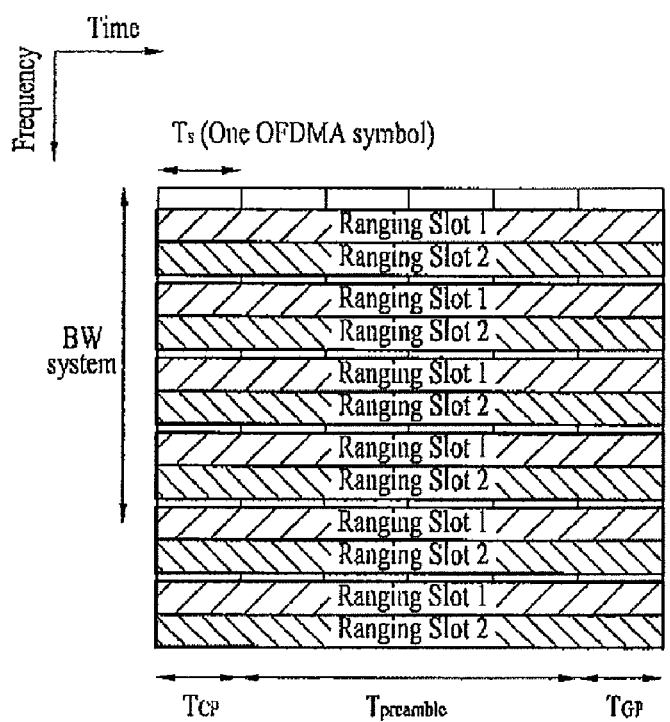
Figure 16:
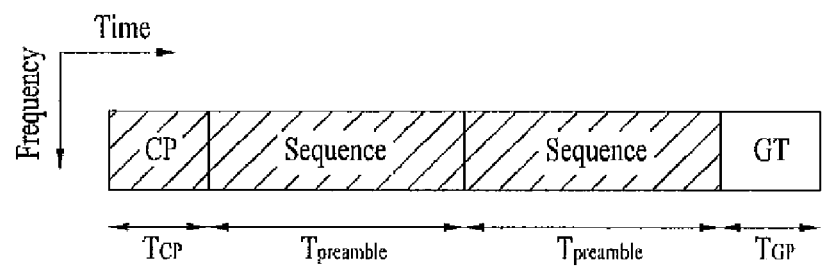
FIGS. 16a and 16b illustrate structures in which a preamble is repeated in localized ranging according to an exemplary embodiment of the present invention.
Figure 16:
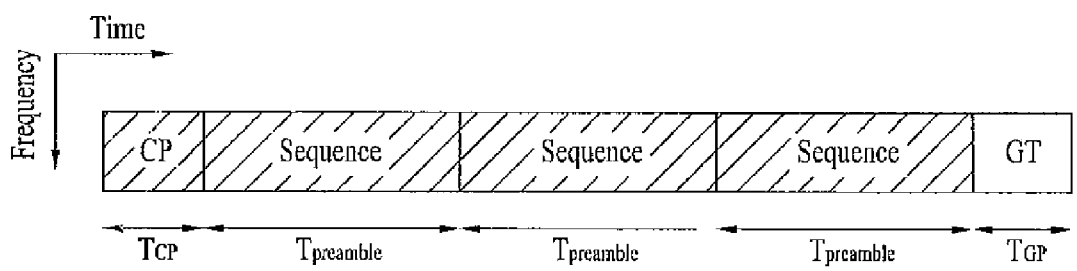
Figure 17:
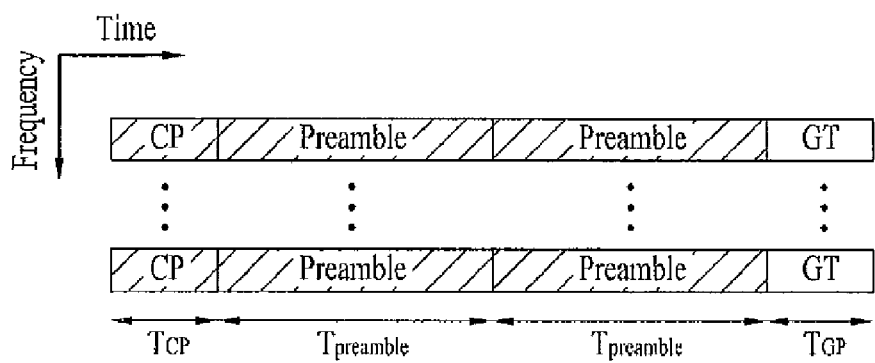
FIGS. 17a and 17b illustrate structures in which a preamble is repeated in localized ranging per basic unit.
Figure 17:
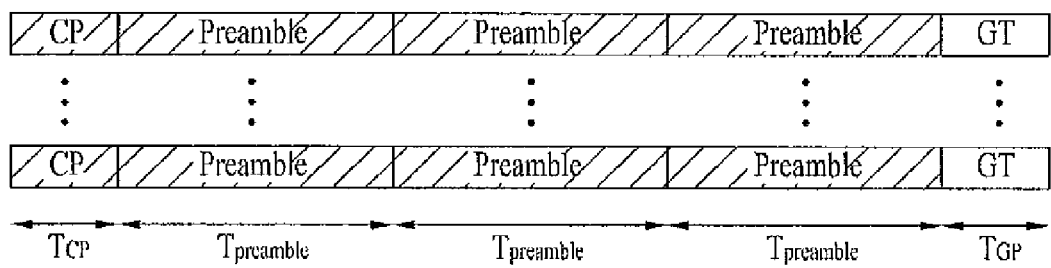

According to another exemplary embodiment of the present invention, if the number of MSs is large and/or to reduce collision probability, and/or to increase opportunity, a plurality of ranging slots may be allocated in the frequency domain. Conversely, ranging slots occupying the same resource may be used together with different code sets between neighbor sectors/cells. FIG. 15 illustrates an example using a plurality of ranging slots.

In another exemplary embodiment of the present invention, a structure is used in which a preamble is repeatedly transmitted. In a specific circumstance, a receiving end can not receive enough preamble energy to detect the preamble. Namely, in a cell in which channel environment is not good or in a UE or cell having great propagation loss, preamble energy necessary for a receiving end may not be obtained only with a basic structure. As another example, if minimum reception energy for data communication of a UE is less than reception energy necessary for ranging in the same environment, the UE may not access the cell. To solve such a problem, it is necessary to use a technique for repeating the preamble once or more. As illustrated in FIGS. 16a to 17b, a preamble may be repeatedly transmitted to increase reception energy.

In FIGS. 16a to 17b, the preamble alone is repeated. When a long ranging CP considering a trip delay is used, it is not necessary to repeat the ranging CP. However, when a short ranging CP which does not consider the trip delay is used, the ranging CP may be repeated as illustrated in FIGS. 18a and 18b.

Figure 18:
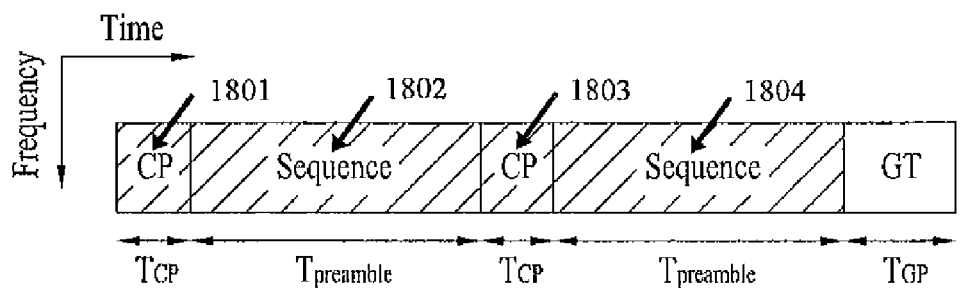
FIGS. 18a and 18b illustrate structures in which both a CP and a preamble are repeated according to an exemplary embodiment of the present invention.
Figure 18:
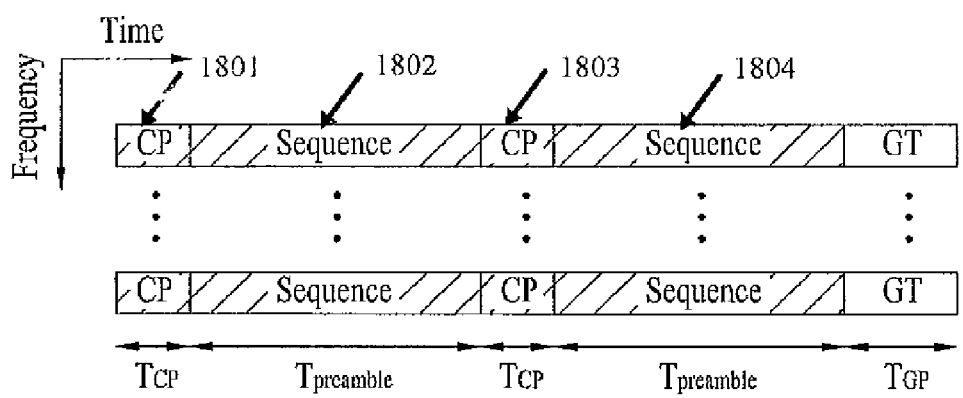

In FIGS. 18a and 18b, both cyclic prefix and preamble are repeated. The ranging signal is transmitted as 'CP+preamble+CP+preamble' by a mobile station. Two repeated preamble can be used to increase received preamble energy by combining at base station. Two repeated CP can be used to prevent impact of delay spread. If the length of each CP is longer than a trip delay, it can be used to prevent impact of propagation delay where a trip delay is the round trip delay or one-way trip delay according to cell size.

According to one embodiment of the present invention, a ranging signal with the structure of FIG. 18a or FIG. 18b may be transmitted with the following steps. First, a mobile station of a broadband wireless access system using multi-carrier may select a ranging code and at least one of a time slot and a frequency slot. Then, the mobile station may generate a first preamble 1802 and a second preamble 1804 using the selected ranging code. Finally, the mobile station may transmit a ranging signal comprising a first cyclic prefix 1801 and a second cyclic prefix 1803, and the first preamble 1802 and the second preamble 1804, at the selected time slot or the frequency slot. The first cyclic prefix 1801 may be identical to a part of the first preamble 1802 or to a part of the second preamble 1804. As such, the second cyclic prefix 1803 may be identical to a part of the first preamble 1802 or to a part of the second preamble 1804. That means, each of the first cyclic prefix 1801 and the second cyclic prefix 1803 may be a duplicate of a part of the first preamble 1802 or a part of the second preamble 1804. Each of the first cyclic prefix 1801 and the second cyclic prefix 1803 may be the same any part of the preambles 1802 and 1804, for example the front end or the rear end of the preambles 1802 and 1804. In addition, the waveform of the first cyclic prefix 1801 may be the same as that of the second cyclic prefix 1803. It should be noted that the second preamble 1804 can be generated from a ranging code which is different from the ranging code used for generating the first preamble 1802. The ranging signal may be a random access signal.

Above described embodiments can be implemented with an apparatus comprising at least transmission/reception antennas and general-purpose electric devices and/or specific-purpose electric devices electrically connected to the antennas. For example, the selection of ranging code and at least one of a time slot and a frequency slot according to the one embodiment of the present invention, can be performed at either a general-purpose electric devices such as central processing unit (CPU) or a special-purpose electric devices like application specific integrated circuit (ASIC). The same idea is applicable to the generation of the first and the second preambles and to the transmission of the ranging signal. The transmission can be conducted through the antennas equipped in the apparatus. Each process for completion of the present invention can be implemented with software, hardware, or firmware. A logical module for each of the processes or steps for implemented the present invention may either be distributed over several independent electrical devices or reside on a single electrical device.

In the above embodiments, a conventional 16e code as well as a CAZAC-series sequence (ZC sequence or generalized chirp-like (GCL) sequence) may be used as a sequence for ranging.

When the above embodiments are implemented in an environment in which both 16e and 16m exist, that is, when a previous system legacy should be supported, cell coverage is limited to a 16e system structure. Therefore, both a 16e UE and a 16m UE can use the conventional 16e ranging structure. Alternatively, the 16e UE may use the 16e ranging structure and the 16m UE may use the 16m ranging structure. In this case, the 16m UE may use only the 16m ranging structure, or in some case, the 16m UE may selectively use the 16e ranging structure or the 16m ranging structure. As these conditions, a probability value broadcast from a BS may be used. The 16e UE uses only the 16e ranging structure, whereas the 16m UE may selectively use the 16e or 16m ranging structure by the probability value.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. Embodiments may be constructed by a combination of claims which do not have an explicit cited relation in the appended claims or new claims may be included by amendment after application.

In the exemplary embodiments of the present invention, a description has been made of a data transmission and reception relationship between a base station and a user equipment. Here, the base station refers to a terminal node of a network communicating directly with the user equipment. In some cases, a specific operation described as performed by the base station may be performed by an upper node of the base station. Namely, it is apparent that, in a network comprised of a plurality of network nodes including a base station, various operations performed for communication with a user equipment may be performed by the base station, or network nodes other than the base station. The term 'base station' may be replaced with the term of fixed station, Node B, eNode B (eNB), access point, etc. The term 'user equipment' may be replaced with the term of mobile station, mobile subscriber station (MSS), ranging subscriber station (RSS), etc.

The embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be applied to a wireless communication system such as a mobile communication system and a wireless Internet system, specifically to an LTE system as well as an IEEE 802.16m system.

The invention claimed is:

1. A method for performing ranging by a User Equipment (UE) in a broadband wireless access system using multi-carrier, the method comprising:
    selecting a ranging code and a ranging channel; and
    transmitting the selected ranging code at the selected ranging channel,
    wherein the ranging code includes at least one of a cyclic prefix, a guard time and a ranging preamble, and
    a time length of the ranging code is longer than two predetermined successive orthogonal frequency division multiple access (OFDMA) symbol periods,
    wherein the ranging channel is comprised of basic units, and each of the basic units is not adjacent to each other in a frequency domain.

2. The method according to claim 1, wherein the sum of a duration time of the cyclic prefix and a duration time of the guard time is greater than the sum of a delay spread of a channel and a trip delay.

3. The method according to claim 1, wherein the ranging preamble is repeated two times or more in the ranging code.

4. The method according to claim 1, wherein oversampling is performed at a predetermined sampling rate according to a symbol length of the ranging code.

5. The method according to claim 4, wherein a length of the ranging preamble is 457.14 µs, a size of discrete Fourier transform (UFT) according to the oversampling is 5120 points, and subcarrier spacing according the oversampling is 2.1875 kHz.

6. The method according to claim 1, wherein the basic units are separated from each other with the same distance along frequency axis.

7. The method according to claim 1, wherein the ranging code is for a random access signal.

8. The method according to claim 1, wherein the ranging preamble includes a second cyclic prefix, a ranging sequence, and a copy of the ranging sequence.

9. The method according to claim 8, wherein the second cyclic prefix is disposed between the ranging sequence and the copy of the ranging sequence.

10. A method for performing ranging by a base station in a broadband wireless access system using multi-carrier, the method comprising:
    receiving a ranging code through a ranging channel; and
    performing ranging processing using the received ranging code,
    wherein the ranging code includes at least one of a cyclic prefix, a guard time and a ranging preamble, and
    a time length of the ranging code is longer than two predetermined successive orthogonal frequency division multiple access (OFDMA) symbol periods,
    wherein the ranging channel is comprised of basic units, and each of the basic units is not adjacent to each other in a frequency domain.

11. The method according to claim 10, wherein the basic units are separated from each other with the same distance along frequency axis.

* * * * *